US008022149B2

(12) United States Patent
Ueda et al.

(10) Patent No.: US 8,022,149 B2
(45) Date of Patent: Sep. 20, 2011

(54) ORGANIC POLYMER CONTAINING REACTIVE SILICON GROUP

(75) Inventors: Kazuhiko Ueda, Kobe (JP); Jun Hattori, Takasago (JP); Shintaro Komitsu, Takasago (JP)

(73) Assignee: Kaneka Corporation, Osaka (JP)

( * ) Notice: Subject to any disclaimer, the term of this patent is extended or adjusted under 35 U.S.C. 154(b) by 1169 days.

(21) Appl. No.: 10/555,083

(22) PCT Filed: Apr. 23, 2004

(86) PCT No.: PCT/JP2004/005956
§ 371 (c)(1),
(2), (4) Date: Oct. 31, 2005

(87) PCT Pub. No.: WO2004/096887
PCT Pub. Date: Nov. 11, 2004

(65) Prior Publication Data
US 2006/0211821 A1 Sep. 21, 2006

(30) Foreign Application Priority Data

May 2, 2003 (JP) ................. 2003-127367

(51) Int. Cl.
*C08G 65/02* (2006.01)
(52) U.S. Cl. ........................ 525/403; 525/102
(58) Field of Classification Search .......... 525/403, 525/102
See application file for complete search history.

(56) References Cited

U.S. PATENT DOCUMENTS

| 3,971,751 | A | 7/1976 | Isayama et al. |
| 5,109,064 | A | 4/1992 | Wakabayashi et al. |
| 5,811,566 | A | 9/1998 | Watabe et al. |
| 6,207,766 | B1 * | 3/2001 | Doi et al. ............... 525/403 |
| 6,350,345 | B1 | 2/2002 | Kotani et al. |
| 6,812,279 | B2 | 11/2004 | Tamai et al. |
| 7,151,128 | B2 * | 12/2006 | Fujimoto et al. ........ 524/404 |
| 2003/0027974 | A1 * | 2/2003 | Tamai et al. ........... 528/271 |

FOREIGN PATENT DOCUMENTS

| EP | 0 265 929 A2 | 5/1988 |
| EP | 0 673 972 A1 | 9/1995 |
| EP | 0 693 513 A2 | 1/1996 |
| EP | 1 277 769 B1 | 12/2004 |
| EP | 1 057 866 B1 | 3/2005 |
| JP | 8-176429 A | 7/1996 |
| JP | 08-176429 A * | 7/1996 |
| JP | 8-231707 A | 9/1996 |
| JP | 08-231707 A * | 10/1996 |
| JP | 09-194735 A * | 7/1997 |
| JP | 9-194735 A | 7/1997 |
| JP | 2001049113 | 2/2001 |
| JP | 2002-3059489 * | 7/2002 |
| JP | 2002-308959 A | 10/2002 |
| JP | 2002-309077 A | 10/2002 |
| JP | 2002 356613 * | 12/2002 |
| JP | 2003-049063 A | 2/2003 |
| JP | 03-105078 A * | 4/2003 |
| JP | 2003-096106 | 4/2003 |
| JP | 2003-105078 A | 4/2003 |
| JP | 2003-313418 A | 11/2003 |
| JP | 2004-225020 A | 8/2004 |
| JP | 2004-315702 A | 11/2004 |

\* cited by examiner

*Primary Examiner* — Kuo-Liang Peng
(74) *Attorney, Agent, or Firm* — Sughrue Mion, PLLC

(57) ABSTRACT

The present invention provides a solution to a problem that a composition including a reactive silicon group-containing polyether undergoes red coloration. More specifically, in a reactive silicon group-containing organic polymer which contains Co, the problem concerned is solved by limiting the Co content to 0.5 ppm or less. As the reactive silicon group-containing organic polymer, for example, a reactive silicon group-containing polyether (A) or a mixture of the reactive silicon group-containing polyether (A) and a vinyl polymer (B) may be cited. The reactive silicon group-containing polyether (A) is obtained, for example, by reacting a polyether or a derivative thereof which contains Co in a content of 0.5 ppm or less with a silane compound which has a group capable of reacting with the polyether or the derivative thereof and has a hydrolyzable group.

2 Claims, No Drawings

ORGANIC POLYMER CONTAINING REACTIVE SILICON GROUP

RELATED APPLICATION

This application is a national stage of PCT application PCT/JP2004/005956 filed on Apr. 23, 2004, claiming priority to Japanese Application No. 2003-127367 filed on May 2, 2003.

TECHNICAL FIELD

The present invention relates to a polymer, more specifically, to a polymer which includes a polyether curable due to the reaction of reactive silicon groups.

BACKGROUND ART

Among polyethers which have reactive silicon groups in the molecules thereof is, for example, a polyether produced and distributed by Kaneka Corp. under a trade name of Kaneka MS polymer. Japanese Patents Laid-Open Nos. 8-231707, 8-176429 and 8-295804, and the like disclose that when the total content of the ionic impurities such as sodium, cobalt, zinc and chlorine is larger than 50 ppm in a reactive silicon group-containing polyether obtained by use of a polyether as a starting material which is obtained by polymerization with a double metal cyanide complex catalyst, the storage stabilities and the like of the reactive silicon group-containing polyether and compositions derived therefrom are lowered, and hence the total content of the ionic impurities is preferably 50 ppm or less, more preferably 30 ppm or less, and furthermore preferably 20 ppm or less. However, even if the total content of the ionic impurities is decreased to 20 ppm or less, a problem arises that compositions containing such a reactive silicon group-containing polyether may cause red coloration, and the problem still remains unsolved. Reactive silicon group-containing compositions are used as sealants and adhesives, and hence the external appearance of such compositions is preferably colorless and transparent or pale in color and transparent. Accordingly, there is a problem that significant red coloration, if any, restricts the application of these compositions to the above described purposes.

DISCLOSURE OF THE INVENTION

The present invention takes as its object the solution of the above described coloration problem.

More specifically, the present invention relates to the following polymers.

(1) A reactive silicon group-containing organic polymer which contains Co in a content of 0.5 ppm or less.

(2) The polymer according to (1), in which the reactive silicon group-containing organic polymer is a reactive silicon group-containing polyether (A) or a mixture of a reactive silicon group-containing polyether (A) and a vinyl polymer (B).

(3) The polymer according to (2), in which the reactive silicon group-containing polyether (A) is obtained by reacting a hydroxylated polyether which contains Co in a content of 0.5 ppm or less with an isocyanate group-containing silane compound.

(4) The polymer according to (2), in which the reactive silicon group-containing polyether (A) is obtained by reacting a hydroxylated polyether which contains Co in a content of 0.5 ppm or less first with a polyisocyanate compound and then with an amino group-containing silane compound.

(5) The polymer according to (2), in which the reactive silicon group-containing polyether (A) is produced by using as a starting material an unsaturated group-containing polyether which contains Co in a content of 0.5 ppm or less.

(6) The polymer according to (5), in which the reactive silicon group-containing polyether (A) is obtained by reacting an unsaturated group-containing polyether which contains Co in a content of 0.5 ppm or less with a hydrogen group-containing silane compound.

(7) The polymer according to (5), in which the reactive silicon group-containing polyether (A) is obtained by reacting an unsaturated group-containing polyether which contains Co in a content of 0.5 ppm or less with a mercapto group-containing silane compound.

(8) The polymer according to (2), in which the vinyl polymer (B) is obtained by reacting a mercapto group-containing compound.

(9) The polymer according to (8), in which the mercapto group-containing compound is a mercapto group-containing silane compound.

(10) The polymer according to any one of (2) to (9), in which the vinyl polymer (B) is a reactive silicon group-containing vinyl polymer.

(11) The polymer according to any one of (1) to (10), in which the reactive silicon group is a hydrolyzable group-containing silicon group.

(12) The polymer according to any one of (2) to (11), in which the reactive silicon group-containing polyether (A) is a polyether obtained in the presence of a double metal cyanide complex catalyst.

BEST MODE FOR CARRYING OUT THE INVENTION

The polymers involved in the present invention will be described below in detail.

<Reactive Silicon Group-Containing Polyether (A)>

As an oxyalkylene polymer constituting the polymer main chain of the component (A) in the present invention, a polymer represented by the general formula (I) can be used, and an oxypropylene polymer is preferable because of easy availability:

$$(-R^1-O-)_n-\quad\quad(I)$$

wherein $R^1$ is a divalent alkylene group having 1 to 4 carbon atoms. The oxypropylene polymer may be a linear polymer, a branched polymer or a mixture thereof. Additionally, other monomer units and the like may be included in the oxypropylene polymer; however, the proportion of the monomer unit represented by the above described formula in the polymer is preferably 50 wt % or more, and more preferably 80 wt % or more.

The reactive silicon group-containing oxyalkylene polymer as the component (A) of the present invention is preferably obtained by introducing reactive silicon groups into a functional group-containing oxyalkylene polymer.

The oxyalkylene polymer has preferably a molecular weight of 6,000 or more, and more preferably 10,000 or more, from the viewpoint of elongation. The oxyalkylene polymer has preferably a molecular weight distribution (Mw/Mn) of as small as 1.5 or less from the viewpoints of viscosity and workability; however, no particular constraint is necessarily imposed on the molecular weight distribution, and the oxyalkylene polymer having a molecular weight distribution of 1.5 or more may also be used.

Such an oxypropylene polymer can be obtained on the basis of processes using double metal cyanide complex catalysts cited as examples, for example, in Japanese Patent Publication Nos. 46-27250 and 59-15336. Reactive silicon group-containing oxyalkylene polymers obtained by use of double metal cyanide complex catalysts are described, for example, in Japanese Patent Laid-Open Nos. 3-47825, 3-72527 and 2003-55451, and the like.

The reactive silicon group-containing oxyalkylene polymer as the component (A) of the present invention contains Co in a content of 0.5 ppm or less. The Co contained is mainly derived from the residue of a double metal cyanide complex catalyst used as polymerization catalyst in the production of the oxypropylene polymer.

The introduction of a reactive silicon group may be carried out on the basis of processes well known in the art. Examples of such processes may include the following processes.

(1) An oxyalkylene polymer having functional groups such as hydroxy groups at the terminals thereof is reacted with an organic compound having an active group capable of reacting with the functional groups and also having an unsaturated group to yield an unsaturated group-containing oxyalkylene polymer, or an unsaturated group-containing oxyalkylene polymer is obtained by copolymerization with an unsaturated group-containing epoxy compound. Then, the obtained reaction product is reacted with a hydrosilane having a reactive silicon group to carry out hydrosilylation.

(2) An unsaturated group-containing oxyalkylene polymer obtained in the same manner as in the process (1) is reacted with a compound having a mercapto group and a reactive silicon group.

(3) An oxyalkylene polymer having functional groups (hereinafter referred to as functional groups Y) such as a hydroxy group, an epoxy group and an isocyanate group at the terminals thereof is reacted with a compound having a functional group (hereinafter referred to as a functional group Y') capable of reacting with the functional groups Y and also having a reactive silicon group.

Specific examples of the silicon compound having the functional group Y' may include: amino group-containing silanes such as γ-(2-aminoethyl)aminopropyltrimethoxysilane, γ-(2-aminoethyl)aminopropylmethyldimethoxysilane and γ-aminopropyltriethoxysilane; mercapto group-containing silanes such as γ-mercaptopropyltrimethoxysilane and γ-mercaptopropylmethyldimethoxysilane; epoxy silanes such as γ-glycidoxypropyltrimethoxysilane and β-(3,4-epoxycyclohexyl)ethyltrimethoxysilane; vinylic unsaturated group-containing silanes such as vinyltriethoxysilane, γ-methacryloyloxypropyltrimethoxysilane and γ-acryloyloxypropylmethyldimethoxysilane; chlorine atom-containing silanes such as γ-chloropropyltrimethoxysilane; isocyanate-containing silanes such as γ-isocyanatepropyltriethoxysilane, γ-isocyanatepropylmethyldimethoxysilane and γ-isocyanatepropyltrimethoxysilane; and hydrosilanes such as methyldimethoxysilane, trimethoxysilane, methyldiethoxysilane and triethoxysilane. However, the silicon compound having the functional group Y' is not limited to these examples.

The number average molecular weight of the component (A) as referred to in the present specification is defined as follows. The molecular weight concerned is defined as a number average molecular weight which is obtained by directly measuring the end-group concentration with the aid of a titrimetric analysis based on the hydroxyl value measurement method in conformity with JISK 1557 and the iodine value measurement method in conformity with JISK 0070, wherein the structure of the polyether oligomer is taken into account. Alternatively, the molecular weight concerned can be obtained by deriving a calibration curve between the molecular weight relative to polystyrene standard obtained by the GPC measurement which is a general method of relative measurement of the number average molecular weight and the above end-group molecular weight, and by thereby converting the GPC molecular weight to the end-group molecular weight. The Mw/Mn values were obtained on the basis of the GPC measurement.

The reactive silicon group possessed by the reactive silicon group-containing oxyalkylene polymer as the component (A) of the present invention is represented, for example, by the general formula (II):

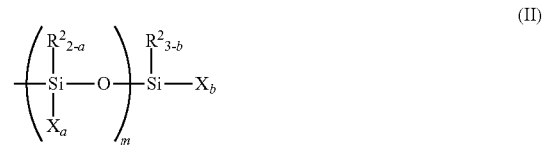

(II)

wherein $R^2$s are different or the same groups selected from the group consisting of a monovalent substituted or nonsubstituted organic group having 1 to 24 carbon atoms and a triorganosiloxy group; Xs are hydroxy groups or different or the same hydrolyzable groups; a is an integer of 0, 1 or 2, and b is an integer of 0, 1, 2 or 3 with the proviso that the relation, $\Sigma a+b \geq 1$, is satisfied; and m is an integer of 0 to 19.

A reactive silicon group preferable from the viewpoint of economic efficiency is a group represented by the general formula (III):

(III)

wherein $R^2$s and Xs are the same as above, and n is an integer of 1, 2 or 3.

Specific examples of the hydrolyzable group in formula (II) may include a halogen atom, a hydrogen atom, an alkoxy group, an acyloxy group, a ketoxymate group, an amino group, an amide group, an aminooxy group, a mercapto group and an alkenyloxy group. Among these groups, alkoxy groups such as a methoxy group and an ethoxy group are preferable from the viewpoint of moderate hydrolyzability. One to three hydrolyzable groups and/or hydroxy groups can bonded to one silicon atom, and it is preferable that $\Sigma a+b$ falls within a range from 1 to 5. When two or more hydrolyzable groups and/or hydroxy groups are bonded in a reactive silicon group, they may be the same or different.

Specific examples of $R^2$ in formula (II) may include: alkyl groups such as a methyl group and an ethyl group; cycloalkyl groups such as a cyclohexyl group; aryl groups such as a phenyl group; and aralkyl groups such as a benzyl group. $R^2$ may also be a triorganosiloxy group. Among these groups, a methyl group is particularly preferable.

The reactive silicon group may be formed with one or more silicon atoms; when silicon atoms connected by siloxane bonds or the like are involved, it may be formed with about twenty silicon atoms.

More specific examples of the reactive silicon group may include a trimethoxysilyl group, a triethoxysilyl group, a triisopropoxysilyl group, a methyldimethoxysilyl group, a methyldiethoxysilyl group and a methyldiisopropoxysilyl group. Among these groups, a methyldimethoxysilyl group is particularly preferable from the viewpoints of reactivity, storage stability, mechanical properties after curing and the like.

<Vinyl Polymer (B)>

The vinyl polymer as the component (B) of the present invention is a polymer which includes, as the main monomer unit components, alkyl acrylate monomer units and/or alkyl methacrylate monomer units each containing an alkyl group having 1 to 24 carbon atoms, wherein a reactive silicon group may or may not be bonded within the molecule of the vinyl polymer.

The alkyl acrylate monomer unit and/or the alkyl methacrylate monomer unit, each containing an alkyl group having 1 to 24 carbon atoms, as the monomer units in the above polymer, is represented by the general formula (IV):

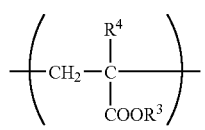

(IV)

wherein $R^4$ represents a hydrogen atom or a methyl group, and $R^3$ represents an alkyl group having 1 to 24 carbon atoms.

Examples of $R^3$ in above general formula (IV) may include alkyl groups having 1 to 24 carbon atoms such as a methyl group, an ethyl group, a propyl group, a n-butyl group, a t-butyl group, a 2-ethylhexyl group, a nonyl group, a lauryl group, a tridecyl group, a cetyl group, a stearyl group and a biphenyl group. The monomer species represented by the monomer unit of general formula (IV) may be used each alone or in combinations of two or more thereof.

As the alkyl acrylate monomer, those well known in the art can be widely used. Examples of such alkyl acrylates may include: methyl acrylate, ethyl acrylate, n-propyl acrylate, n-butyl acrylate, isobutyl acrylate, tert-butyl acrylate, n-hexyl acrylate, heptyl acrylate, 2-ethylhexyl acrylate, nonyl acrylate, decyl acrylate, undecyl acrylate, lauryl acrylate, tridecyl acrylate, myristyl acrylate, cetyl acrylate, stearyl acrylate, behenyl acrylate and biphenyl acrylate. Also, as the alkyl methacrylate monomer unit, those well known in the art can be widely used. Examples of such alkyl methacrylates may include: methyl methacrylate, ethyl methacrylate, n-propyl methacrylate, n-butyl methacrylate, isobutyl methacrylate, tert-butyl methacrylate, n-hexyl methacrylate, heptyl methacrylate, 2-ethylhexyl methacrylate, nonyl methacrylate, decyl methacrylate, undecyl methacrylate, lauryl methacrylate, tridecyl methacrylate, myristyl methacrylate, cetyl methacrylate, stearyl methacrylate, behenyl methacrylate and biphenyl methacrylate.

The molecular chain of the polymer (B) substantially includes one or more types of alkyl acrylate monomer units and/or alkyl methacrylate monomer units. Herein, the expression "substantially includes the above monomer units" means that the proportion of the alkyl acrylate monomer units and/or alkyl methacrylate monomer units present in the polymer (B) exceeds 50 wt %, and is preferably 70 wt % or more; in the polymer (B), in addition to the alkyl acrylate monomer unit and/or alkyl methacrylate monomer unit, other monomer units having copolymerizability with these monomer units may be included. Examples of such other monomer units may include: acrylic acids such as acrylic acid and methacrylic acid; amide group-containing monomers such as acrylamide, methacrylamide, N-methylolacrylamide and N-methylolmethacrylamide; epoxy group-containing monomers such as glycidyl acrylate and glycidyl methacrylate; amino group-containing monomers such as diethylaminoethyl acrylate, diethylaminoethyl methacrylate and aminoethyl vinyl ether; polyoxyethylene group-containing monomers such as polyoxyethylene acrylate and polyoxyethylene methacrylate; and other monomer units such as acrylonitrile, styrene, α-methylstyrene, alkyl vinyl ether, vinyl chloride, vinyl acetate, vinyl propionate and ethylene.

The monomer composition of the polymer (B) is selected according to the intended use and purpose; for example, when the intended use and purpose demand strength, the preferred monomer composition is the one having a relatively high glass transition temperature, and it is recommended to select a monomer composition that yields the polymer (B) having a glass transition temperature of 0° C. or higher, more preferably 20° C. or higher. On the contrary, when the viscosity, the workability, the low-temperature properties and the like are important, the preferred composition is the one having a relatively low glass transition temperature.

With respect to the molecular weight of the polymer component (B), those polymers (B) having a number average molecular weight of 500 to 100,000 relative to polystyrene standard as measured by GPC may be used.

The polymer (B) may be obtained by means of the common vinyl polymerization process or the like. The vinyl polymerization can be carried out in a solvent. Examples of such a solvent may include: aromatic solvents such as toluene and xylene; alcohol solvents such as n-propyl alcohol, isopropyl alcohol, n-butanol, isobutanol, n-hexanol and cyclohexanol; ester solvents such as ethyl acetate and butyl acetate; and ketone solvents such as methyl isobutyl ketone. Alternatively, the polymerization reaction concerned may be carried out in a plasticizer. The plasticizer used as polymerization solvent may be used as it is as a plasticizer component in a composition. The polymerization reaction concerned may also be carried out in the reactive silicon group-containing polyether (A), in an unsaturated group-containing polyether which is a precursor of the polyether (A) or in a hydroxylated polyether which is also a precursor of the polyether (A). The polymerization reaction concerned may be carried out by adding, for example, the above monomers, a radical initiator, a chain transfer agent and the like and by allowing the mixture thus obtained to react at 50 to 150° C.

Examples of such a radical initiator may include azobisisobutyronitrile and benzoyl peroxide; examples of such a chain transfer agent may include mercaptanes such as n-dodecylmercaptane, t-dodecylmercaptane and laurylmercaptane, and halogen-containing compounds.

Various processes are available for the introduction of the reactive silicon group into the polymer (B). Examples of such processes may include the following processes. However, the process concerned is not particularly limited to these examples.

(i) A process in which an alkyl acrylate monomer and/or an alkyl methacrylate monomer is polymerized in the presence of a reactive silicon group-containing mercaptan as a chain transfer agent to introduce the reactive silicon groups into the molecular terminals.

(ii) A process in which an alkyl acrylate monomer and/or an alkyl methacrylate monomer is polymerized in the presence of a compound (for example, acrylic acid) having a mercapto group and a reactive functional group (other than a silicon group, hereinafter referred to as a Y group) as a chain transfer agent; thereafter the thus produced polymer is reacted with a compound having a reactive silicon group and functional groups (hereinafter referred to as Y' groups) capable of reacting with the Y group (for example, a compound having an isocyanate group and a —Si(OCH$_3$)$_3$ group) to introduce the reactive silicon groups into the molecular terminals.

(iii) A process in which an alkyl acrylate monomer and/or an alkyl methacrylate monomer is polymerized by using as an initiator a reactive silicon group-containing azobisnitrile compound or a reactive silicon group-containing disulfide compound to introduce the reactive silicon groups into the molecular terminals.

(iv) A process in which an alkyl acrylate monomer and/or an alkyl methacrylate monomer is polymerized by means of the living radical polymerization process to introduce the reactive silicon groups into the molecular terminals.

(v) A process in which a compound having a polymerizable unsaturated bond and a reactive silicon group is copolymerized with an alkyl acrylate monomer and/or an alkyl methacrylate monomer by selecting the polymerization conditions such as the used amount proportion of the monomers, the amount of the chain transfer agent, the amount of the radical initiator and the polymerization temperature so that one or more reactive silicon groups may be introduced per one molecule of the copolymer.

Examples of the reactive silicon group-containing mercaptane used as the chain transfer agent described in (i) may include γ-mercaptopropyltrimethoxysilane, γ-mercaptopropylmethyldimethoxysilane and γ-mercaptopropyltriethoxysilane.

As the examples of the Y group and the Y' group described in (ii), there are combinations of various groups; for example, an amino group, a hydroxy group or a carboxylic acid group may be cited as the Y group, and an isocyanate group may be cited as the Y' group. As described in Japanese Patent Laid-Open Nos. 54-36395, 1-272654 and 2-214759, there may be cited another example such that the Y group is an ally group and the Y' group is a silicon hydride group (H—Si). In this case, the Y and Y' groups can be bonded to each other through the hydrosilylation reaction in the presence of a group VIII transition metal.

Examples of the reactive silicon group-containing azobisnitrile compound and the reactive silicon group-containing disulfide compound described in (iii) may include an alkoxysilyl group-containing azobisnitrile compound and an alkoxysilyl group-containing disulfide compound described in Japanese Patent Laid-Open Nos. 60-23405 and 62-70405, and the like.

Examples of the process described in (iv) may include a process of atom transfer radical polymerization described in Japanese Patent Laid-Open No. 9-272714 and the like.

Examples of the compound having a polymerizable unsaturated bond and a reactive silicon group described in (v) may include a monomer represented by the general formula (V):

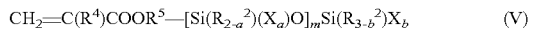

$$CH_2=C(R^4)COOR^5—[Si(R_{2-a}^2)(X_a)O]_mSi(R_{3-b}^2)X_b \quad (V)$$

wherein $R^5$ represents a divalent alkylene group having 1 to 6 carbon atoms, and $R^2$, $R^4$, X, a, b and m are the same as described above, or a monomer represented by the general formula (VI):

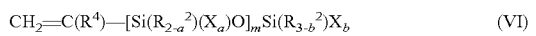

$$CH_2=C(R^4)—[Si(R_{2-a}^2)(X_a)O]_mSi(R_{3-b}^2)X_b \quad (VI)$$

wherein $R^2$, $R^4$, X, a, b and m are the same as described above, namely, γ-methacryloxypropylalkylpolyalkoxysilanes such as γ-methacryloxypropyltrimethoxysilane, γ-methacryloxypropylmethyldimethoxysilane and γ-methacryloxypropyltriethoxysilane; γ-acryloxypropylalkylpolyalkoxysilanes such as γ-acryloxypropyltrimethoxysilane, γ-acryloxypropylmethyldimethoxysilane and γ-acryloxypropyltriethoxysilane; and vinylalkylpolyalkoxysilanes such as vinyltrimethoxysilane, vinylmethyldimethoxysilane and vinyltriethoxysilane. As for the type of the reactive silicon group contained in the acrylic polymer (B), a silicon group having on the silicon atom thereof 1 to 3 reactive groups can be used.

As for the weight ratio (A)/(B) between the polymer (A) and the polymer (B) of the present invention, the production is possible over any wide range of the weight ratio. In general, as (A)/(B) becomes relatively small, mechanical strength and high weather resistance are provided.

<Curable Compositions>

The polymer of the present invention can be added with various compounding agents according to the desired physical properties.

<Curing Catalysts and Curing Agents>

The polymer of the present invention can be added with a curing catalyst. A polymer having cross-linking silyl groups undergoes cross-linking to be cured through formation of siloxane bonds in the presence or absence of one of various condensation catalysts well known in the art. Various forms and characters of cured substances can be produced depending on the molecular weights and main chain skeletons of the polymers, widely ranging from rubbery to resin-like cured substances.

Examples of such condensation catalysts may include: dialkyltin dicarboxylates such as dibutyltin dilaurate, dibutyltin diacetate, dibutyltin diethylhexanoate, dibutyltin dioctate, dibutyltin dimethylmaleate, dibutyltin diethylmaleate, dibutyltin dibutylmaleate, dibutyltin diisooctylmaleate, dibutyltin ditridecylmaleate, dibutyltin dibenzylmaleate, dibutyltin maleate, dioctyltin diacetate, dioctyltin distearate, dioctyltin dilaurate, dioctyltin diethylmaleate and dicotyltin diisooctylmaleate; dialkyltin alkoxides such as dibutyltin dimethoxide and dibutyltin diphenoxide; intramolecular coordination derivatives of dialkyltins such as dibutyltin diacetylacetonate and dibutyltin diethylacetoacetate; reaction products between dialkyltin oxides such as dibutyltin oxide and dioctyltin oxide and ester compounds such as dioctylphthalate, diisodecylphthalate and methylmaleate; reaction products between dialkyltin oxides and silicate compounds such as dibutyltin bistriethoxysilicate and dioctyltin bistriethoxysilicate; tetravalent tin compounds such as oxy derivatives of the above described dialkyltin compounds (stannoxane compounds); divalent tin compounds such as tin octylate, tin naphthenate, tin stearate and tin feruzatate, and reaction products and mixtures of these divalent tin compounds with amine compounds such as laurylamine to be described later; monoalkyltins such as monobutyltin compounds including monobutyltin trisoctoate and monobutyltin triisopropoxide and monooctyltin compounds; titanates such as tetrabutyl titanate, tetrapropyl titanate, tetra(2-ethylhexyl) titanate and isopropoxytitanium bis(ethylacetoacetate); organoaluminum compounds such as aluminum trisacetylacetonate, aluminum trisethylacetoacetate and diisopropoxyaluminum ethylacetoacetate; metal salts of carboxylic acids (2-ethylhexanoic acid, neodecanoic acid, versatic acid, oleic acid, naphthenic acid and the like) such as bismuth carboxylates, iron carboxylates, titanium carboxylates, lead carboxylates, vanadium carboxylates, zirconium carboxylates, calcium carboxylates, potassium carboxylates, barium carboxylates, manganese carboxylates, cerium carboxylates, nickel carboxylates, cobalt carboxylates, zinc carboxylates and aluminum carboxylates, and reaction products and mixtures of these metal carboxylates with amine compounds such as laurylamine to be described later; chelate compounds such as zirconium tetraacetylacetonate, zirconium tributoxy acetylacetonate, dibutoxy zirconium diacetylacetonate, zirconium acetylacetonate bis(ethylacetoacetate) and titanium tetraacetylacetonate; aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine and cyclohexylamine; aliphatic secondary amines such as dimethylamine, diethylamine, dipropylamine, diisopropylamine, dibutylamine, diamylamine, dioctylamine, di(2-ethylhexyl)amine, didecylamine, dilaurylamine, dicetylamine, distearylamine, methylstearylamine, ethylstearylamine and butylstearylamine; aliphatic tertiary amines such as triamylamine, trihexylamine and trioctylamine; unsaturated aliphatic amines such as triallylamine and oleylamine; aromatic amines such as laurylaniline, stearylaniline and triphenylamine; other amine compounds such as monoethanolamine, diethanolamine, triethanolamine, diethylenetriamine, triethylenetetramine, oleylamine, cyclohexylamine, benzylamine, diethylaminopropylamine, xylylenediamine, ethylenediamine, hexamethylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo(5,4,0)undecene-7 (DBU), and salts of these amines with carboxylic acids and the like; reaction products and mixtures between amine compounds and organic tin compounds such as the reaction product and the mixture between laurylamine and tin octylate; low molecular weight polyamide resins obtained from excessive polyamines and polybasic acids; reaction products between excessive polyamines and epoxy compounds; and γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, N-(β-aminoethyl)aminopropyltrimethoxysilane, N-(β-aminoethyl)aminopropylmethyldimethoxysilane, N-(β-aminoethyl)aminopropyltriethoxysilane, N-(β-aminoethyl)aminopropylmethyldiethoxysilane, N-(β-aminoethyl)aminopropyltriisopropoxysilane, γ-ureidopropyltrimethoxysilane, N-phenyl-γ-aminopropyltrimethoxysilane, N-benzyl-γ-aminopropyltrimethoxysilane and N-vinylbenzyl-γ-aminopropyltriethoxysilane. Examples of such condensation catalysts may also include: silanol condensation catalysts as derivatives of these compounds obtained by modification thereof, namely, amino group-containing silane coupling agents such as amino-modified silyl polymer, silylated aminopolymer, unsaturated aminosilane complex, phenylamino-long chain alkylsilane and aminosilylated silicone; and other silanol condensation catalysts well known in the art, namely, acidic catalysts such as fatty acids inclusive of versatic acid and organic acidic phosphate compounds and basic catalysts. Specific examples of the organic acidic phosphate compounds may include the following compounds, but the organic acidic phosphate compounds are not limited to these examples shown below.

$(CH_3O)_2—P(=O)(—OH)$, $(CH_3O)—P(=O)(—OH)_2$, $(C_2H_5O)_2—P(=O)(—OH)$, $(C_2H_5O)—P(=O)(—OH)_2$, $(C_3H_7O)_2—P(=O)(—OH)$, $(C_3H_7O)—P(=O)(—OH)_2$, $(C_4H_9O)_2—P(=O)(—OH)$, $(C_4H_9O)—P(=O)(—OH)_2$, $(C_8H_{17}O)_2—P(=O)(—OH)$, $(C_8H_{17}O)—P(=O)(—OH)_2$, $(C_{10}H_{21}O)_2—P(=O)(—OH)$, $(C_{10}H_{21}O)—P(=O)(—OH)_2$, $(C_{13}H_{27}O)_2—P(=O)(—OH)$, $(C_{13}H_{27}O)—P(=O)(—OH)_2$, $(C_{16}H_{33}O)_2—P(=O)(—OH)$, $(C_{16}H_{33}O)—P(=O)(—OH)_2$, $(HO—C_6H_{12}O)_2—P(=O)(—OH)$, $(HO—C_6H_{12}O)—P(=O)(—OH)_2$, $(HO—C_8H_{16}O)—P(=O)(—OH)$, $(HO—C_8H_{16}O)—P(=O)(—OH)_2$, $[(CH_2OH)(CHOH)O]_2—P(=O)(—OH)$, $[(CH_2OH)(CHOH)O]—P(=O)(—OH)_2$, $[(CH_2OH)(CHOH)C_2H_4O]_2—P(=O)(—OH)$, $[(CH_2OH)(CHOH)C_2H_4O]—P(=O)(—OH)_2$.

The combinations of these organic acids with amines are high in catalytic activity, and are thereby more preferable from the viewpoint of being capable of reducing the used amounts thereof. Among the combinations of the organic acids with amines, the combination of an acidic phosphate with an amine and the combination of an organic carboxylic acid with an amine, particularly, the combination of an organic acidic phosphate with an amine and the combination of an aliphatic carboxylic acid with an amine are preferable from the viewpoints of the higher catalytic activity and the rapid curability.

These catalysts may be used each alone or in combinations of two or more thereof. The blended amount of each of these condensation catalysts is preferably approximately 0.01 to 20 parts (by weight, here and also in what follows), and more preferably 0.5 to 5 parts in relation to 100 parts of a cross-linking silyl group-containing polymer. When the blended amount of the silanol condensation catalyst is less than the above ranges, sometimes the curing rate becomes slow, and the curing reaction hardly proceeds to a sufficient extent. On the other hand, the blended amount of the silanol condensation catalyst exceeds the above ranges, local heat generation and local foaming occur when curing, and a satisfactory cured substance can hardly be obtained, and additionally the pot life becomes too short, so that such a large blended amount of the catalyst concerned is not preferable also from the viewpoint of workability. No particular constraint is imposed on the catalyst concerned, but tin-based curing catalysts give satisfactory results in the sense that such catalysts permit easily controlling the curability.

In the polymer of the present invention, the above described amino group-containing silane coupling agents may be used as cocatalysts for the purpose of further enhancing the activity of each of the condensation catalysts, similarly to the cases of the amine compounds. These amino group-containing silane coupling agents each are a compound which has at least a group (hereinafter referred to as a hydrolyzable silyl group) containing at least a silicon atom bonded to at least a hydrolyzable group and has an amino group; among such hydrolyzable groups as already cited for example, a methoxy group, an ethoxy group and the like are preferable from the viewpoint of hydrolysis rate. The number of the hydrolyzable groups is preferably 2 or more, and particularly preferably 3 or more.

The blended amount of each of these amine compounds is preferably approximately 0.01 to 50 parts by weight, and more preferably 0.1 to 20 parts by weight in relation to 100 parts by weight of a cross-linking silyl group-containing polymer. When the blended amount of the amine compound is less than 0.01 part by weight, sometimes the curing rate becomes slow, and the curing reaction hardly proceeds to a sufficient extent. On the other hand, when the blended amount of the amine compound exceeds 30 parts by weight, sometimes the pot life becomes too short, unpreferably also from the viewpoint of workability.

These amine compounds may be used each alone and as mixtures of two or more thereof.

Silicon compounds having no amino groups and no silanol groups may also be added as cocatalysts. No particular constraint is imposed on these silicon compounds, and preferable are phenyltrimethoxysilane, phenylmethyldimethoxysilane, phenyldimethylmethoxysilane, diphenyldimethoxysilane, diphenyldiethoxysilane and triphenylmethoxysilane. In particular, diphenyldimethoxysilane and diphenyldiethoxysilane are most preferable because of low cost and ease of availability.

The blended amount of each of these silicon compounds is preferably 0.01 to 20 parts, and more preferably 0.1 to 10 parts in relation to 100 parts of a cross-linking silyl group-containing polymer. When the blended amount of the silicon compound is less than the above ranges, sometimes the effect of accelerating the curing reaction becomes small. On the other hand, when the blended amount of the silicon compound exceeds the above ranges, sometimes the hardness and the tensile strength of the cured substance are decreased.

The type and the addition amount of the curing catalyst/curing agent can control the curability, the mechanical properties and the like of the present invention, according to the intended purposes and applications. Also, depending on the reactivity of the silyl group of the cross-linking silyl group-containing polymer, the type and the addition amount of the curing catalyst/curing agent can be varied in such a way that when the reactivity concerned is high, curing can be sufficiently carried out with a small addition amount falling in a range from 0.01 to 1 part.

<Dehydrating Agents>

A dehydrating agent to remove the moisture in the composition of the present invention can be added to the composition, for the purpose of improving the storage stability thereof. As the dehydrating agent, for example, the following compounds can be blended each alone or in combinations of two or more thereof: silane compounds, silane coupling agents and partial hydrolysis condensates thereof such as vinyltrimethoxysilane, methyltrimethoxysilane, ethyl silicate, partial hydrolysis condensate of ethyl silicate, methyl silicate, a partial hydrolysis condensate of methyl silicate, γ-aminopropyltrimethoxysilane, γ-glycidoxypropyltrimethoxysilane, N-(β-aminoethyl)-γ-aminopropyltrimethoxysilane, γ-acryloylpropyltrimethoxysilane, γ-glycidoxypropyltrimethoxysilane, γ-mercaptopropyltrimethoxysilane and N-(β-aminoethyl)-γ-aminopropylmethyldimethoxysilane.

<Adhesion-Imparting Agents>

Silane coupling agents and adhesion-imparting agents other than the silane coupling agents can be added to the composition of the present invention. Addition of an adhesion-imparting agent can reduce, in a more advanced manner, the risk that a sealant is detached from adherends such as siding boards through the moving of joint width and the like caused by external force. Sometimes, an adhesion-imparting agent makes it unnecessary to use a primer to improve adhesion, so that a simplification of construction operation can be expected. Specific examples of the silane coupling agents may include silane coupling agents having functional groups such as an amino group, a mercapto group, an epoxy group, a carboxyl group, a vinyl group, an isocyanate group, an isocyanurate group and a halogen atom, namely: isocyanate group-containing silanes such as γ-isocyanatepropyltrimethoxysilane, γ-isocyanatepropyltriethoxysilane, γ-isocyanatepropylmethyldiethoxysilane and γ-isocyanatepropylmethyldimethoxysilane; amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-ureidopropyltrimethoxysilane, N-phenyl-γ-aminopropyltrimethoxysilane, N-benzyl-γ-aminopropyltrimethoxysilane and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane; carboxysilanes such as β-carboxyethyltriethoxysilane, β-carboxyethylphenylbis(2-methoxyethoxy)silane and N-β-(carboxymethyl)aminoethyl-γ-aminopropyltrimethoxysilane; vinylic unsaturated group-containing silanes such as vinyltrimethoxysilane, vinyltriethoxysilane, γ-methacryloyloxypropylmethyldimethoxysilane and γ-acryloyloxypropylmethyltriethoxysilane; halogen-containing silanes such as γ-chloropropyltrimethoxysilane; and isocyanurate silanes such as tris(trimethoxysilyl)isocyanurate. The reaction products between the above amino group-containing silanes and the above epoxy group-containing silanes, the reaction products between the above amino group-containing silanes and the above acryloyloxy group-containing silanes, and the reaction products between the above amino group-containing silanes and the above isocyanate group-containing silanes can also be used. The derivatives obtained by modifying these compounds, such as amino modified silylpolymer, silylated aminopolymer, unsaturated aminosilane complex, phenylamino-long chain alkylsilane, aminosilylated silicone, blocked isocyanate silane and silylated polyester can also be used as silane coupling agents. The ketimine compounds and the like obtained by the reactions between the above amino group-containing silanes and ketone compounds such as methyl isobutyl ketone can also be used as silane coupling agents.

The silane coupling agents used in the present invention are usually used in a range from 0.1 to 20 parts, and particularly preferably in a range from 0.5 to 10 parts, in relation to 100 parts of a cross-linking silyl group-containing polymer. The effect of a silane coupling agent added to the polymer of the present invention is such that marked adhesion improvement effects are attained under either non-primer conditions or primer-treatment conditions when the silane coupling agent is applied to various types of adherends, namely, inorganic substrates made of glass, aluminum, stainless steel, zinc, copper and mortar and organic substrates made of polyvinyl chloride, acrylic resin, polyester, polyethylene, polypropylene and polycarbonate. When the silane coupling agent is applied under non-primer conditions, improvement effect of adhesion to various adherends is particularly remarkable.

No particular constraint is imposed on the adhesion-imparting agents other than the silane coupling agents, and specific examples of such the adhesion-imparting agents other than silane coupling agents include epoxy resin, phenolic resin, sulfur, alkyl titanates and aromatic polyisocyanates. Epoxy resin can be used through reaction with the above amino group-containing silanes.

These adhesion-imparting agents may be used each alone or as mixtures of two or more thereof. Addition of these adhesion-imparting agents permits improving adhesion to adherends. Without imposing any particular constraint, it is preferable to concomitantly use 0.1 to 20 parts by weight of a silane coupling agent among these adhesion-imparting agents, for the purpose of improving the adhesion, in particular, the adhesion to the surface of a metal adherend such as an oil pan.

<Plasticizers>

Various plasticizers may be used according to need in the polymer of the present invention. Use of a plasticizer in combination with a filler to be described later provides more advantageous effects such that elongation of the cured substance can be made larger and mixing of a large amount of filler is also made possible, without necessitating the addition of such a plasticizer. No particular constraint is imposed on the plasticizer. However, specific examples of the plasticizers meeting the purpose of adjusting physical properties, characters and the like may include: phthalates such as dibutyl phthalate, diheptyl phthalate, di(2-ethylhexyl)phthalate, diisodecyl phthalate and butyl benzyl phthalate; nonaromatic dibasic acid esters such as dioctyl adipate, dioctyl sebacate, dibutyl sebacate and isodecyl succinate; aliphatic esters such as butyl oleate and methyl acetylrecinoleate; esters of polyalkylene glycols such as diethylene glycol dibenzoate, triethylene glycol dibenzoate and pentaerythritol ester; phosphates such as tricresyl phosphate and tributyl phosphate; trimellitates; polystyrenes such as polystyrene and poly-α-methylstyrene; polybutadiene, polybutene, polyisobutylene, butadiene-acrylonitrile and polychloroprene; chlorinated paraffins; hydrocarbon oils such as alkyldiphenyls and partially hydrogenated terphenyls; process oils; polyether polyols such as polyethylene glycol, polypropylene glycol and polytetramethylene glycol, and polyethers such as the derivatives obtained from these polyether polyols by converting the hydroxy groups thereof to other groups such as ester groups and ether groups; epoxy group-containing plasticizer such as epoxidized soybean oil, benzyl epoxystearate and E-PS; polyester plasticizers obtained from dibasic acids such as sebacic acid, adipic acid, azelaic acid and phthalic acid and dihydric alcohols such as ethylene glycol, diethylene glycol, triethylene glycol, propylene glycol and dipropylene glycol; and vinyl polymers, inclusive of acrylic plasticizers, obtained by polymerizing vinyl monomers through various methods.

Among these plasticizers, polymer plasticizers each having a number average molecular weight of 500 to 15,000, when added to a curable composition, can regulate the viscosity and the slump property of the curable composition and the mechanical properties such as tensile strength and elongation of the cured substance obtained by curing the composition, can maintain initial physical properties over a longer period of time as compared to a low molecular weight plasticizer, namely, a plasticizer containing no polymer components in the molecule thereof, and can also improve the drying property (also referred to as coating property) in the case where an alkyd coating material is applied onto the cured substance. The polymer plasticizers concerned are not constrained in such a way that they may have or may not have functional groups.

Although the number average molecular weight of the polymer plasticizer described above is from 500 to 15,000, it is preferably 800 to 10,000, and more preferably 1,000 to 8,000. When the molecular weight is too low, the plasticizer bleeds with time due to heat and rainfall, so that the initial physical properties cannot be maintained over a long period of time, and the alkyd coating property cannot be improved. On the other hand, when the molecular weight is too high, the viscosity becomes high to degrade the workability.

Among these polymer plasticizers, polyether plasticizers and (meth)acrylic polymer plasticizers are preferable from the viewpoint of high elongation or high weather resistance. From the viewpoint of the methods for synthesizing acrylic polymers, acrylic polymers obtained by conventional solution polymerization, those obtained by conventional solvent-free polymerization and the like may be cited. The latter acrylic plasticizers are prepared by means of a high-temperature continuous polymerization method (U.S. Pat. No. 4,414,370, Japanese Patent Laid-Open No. 59-6207, Japanese Patent Publication No. 5-58005, Japanese Patent Laid-Open No. 1-313522, U.S. Pat. No. 5,010,166) without using any solvent and chain transfer agent, and accordingly are more preferable for the object of the present invention. Examples of such polymers may include, without imposing any particular constraint, ARUFON™ UP series (UP-1000, UP-1110, UP-2000 and UP-2130)(referred to as SGO) manufactured by Toagosei Co., Ltd. (See Bosui Journal (Waterproof Journal), June, 2002). Needless to say, the methods for synthesizing acrylic polymers also include the living radical polymerization method as an alternative one. This method is preferable because it leads to a narrow molecular weight distribution of a polymer obtained thereby and permits attaining a low viscosity of the polymer, and the atom transfer radical polymerization method is more preferable, but the methods for synthesizing acrylic polymers are not limited to these methods.

No particular constraint is imposed on the molecular weight distribution of a polymer plasticizer, but the molecular weight distribution is preferably narrow from the viewpoint of viscosity, in such a way that it is preferably 1.8 or less, more preferably 1.7 or less, furthermore preferably 1.6 or less, yet furthermore preferably 1.5 or less, particularly preferably 1.4 or less, and most preferably 1.3 or less.

The above described plasticizers inclusive of polymer plasticizers may be used each alone or in combinations of two or more thereof, but are not necessarily needed. Also, according to need, a polymer plasticizer may be used, and a low molecular weight plasticizer may be used in combination therewith within an amount range not to adversely affect the physical properties. From the viewpoint of compatibility with a mixture of the components (A), (B) and (C), phthalates and acrylic polymers are particularly preferable.

Here, it may be noted that it is possible to blend these plasticizers at the time of polymer preparation.

No constraint is imposed on the used amount of a plasticizer, but it is 5 to 150 parts by weight, preferably 10 to 120 parts by weight and more preferably 20 to 100 parts by weight, in relation to 100 parts by weight of a cross-linking silyl group-containing polymer. When the used amount is less than 5 parts by weight, the plasticizer effect is hardly attained, while when the used amount exceeds 150 parts by weight, the mechanical strength of the cured substance tends to be insufficiently.

<Fillers>

Various fillers may be used according to need in the polymer of the present invention. No particular constraint is imposed on the fillers. However, specific examples of the fillers may include: reinforcing fillers such as wood flour, pulp, cotton chip, asbestos, glass fiber, carbon fiber, mica, walnut hull powder, rice hull powder, graphite, diatomite, white earth, silica (fumed silica, precipitated silica, crystalline silica, fused silica, dolomite, anhydrous silicic acid, hydrous silicic acid, amorphous spherical silica and the like) and carbon black; fillers such as ground calcium carbonate, precipitated calcium carbonate, magnesium carbonate, diatomite, sintered clay, clay, talc, titanium oxide, bentonite, organic bentonite, ferric oxide, red iron oxide, aluminum fine powder, flint powder, zinc oxide, active zinc white, zinc dust, zinc carbonate, shirasu balloon, glass microballoon, organic microballoons of phenolic resin and vinylidene chloride resin, and resin powders such as PVC powder and PMMA powder; and fibrous fillers such as asbestos, glass fiber, glass filament, carbon fiber, Kevlar fiber and polyethylene fiber.

Among these fillers, precipitated silica, fumed silica, crystalline silica, fused silica, dolomite, carbon black, calcium carbonate, titanium oxide, talc and the like are preferable.

In particular, when it is desired to obtain a cured substance having a high transparency or a high strength by use of these fillers, there may be added at least one filler mainly selected from the set consisting of fumed silica, precipitated silica, anhydrous silicic acid, hydrous silicic acid, carbon black, surface-treated fine calcium carbonate, crystalline silica, fused silica, sintered clay, clay, active zinc white and the like. Among these fillers, preferable is an ultrafine powdery silica which has a specific surface area (based on the BET adsorption method) of 50 m$^2$/g or more, usually approximately 50 to 400 m$^2$/g, and preferably approximately 100 to 300 m$^2$/g. Silicas with the surface thereof subjected in advance to hydrophobic treatment with organic silicon compounds such as organosilane, organosilazane and diorganocyclopolysiloxane are further preferable.

More specific examples of the highly reinforcing silica fillers may include, without imposing any particular constraint, Aerosil, a fumed silica, manufactured by Japan Aerosil Co., Ltd. and Nipsil, a precipitated silica, manufactured by Nippon Silica Industrial Co., Ltd.

Transparency can also be obtained by using, as a filler, a resin powder such as PMMA powder and the like.

When it is desired to obtain a cured substance having a low strength and a large elongation, there may be added at least one filler mainly selected from the set consisting of titanium oxide, calcium carbonate, talc, ferric oxide, zinc oxide, shirasu balloon and the like. In general, as for calcium carbonate, when it has a small specific surface area, sufficient improvement effects of the strength at break, the elongation at break, the adhesion and the weather resistant adhesion of the cured substance are not attained as the case may be; the larger is the specific surface area, the larger are the improvement effects of the strength at break, the elongation at break, the adhesion and the weather resistant adhesion of the cured substance.

Additionally, it is more preferable that calcium carbonate is subjected to a surface treatment with a surface treatment agent. It is understood that when a surface-treated calcium carbonate is used, as compared to the case where a non-surface-treated calcium carbonate is used, the workability of the composition of the present invention is improved, the improvement effects of the adhesion and weather resistant adhesion of the curable composition are further elevated. As the surface treatment agent, there are used organic matters and various surfactants such as fatty acids, fatty acid soaps and fatty acid esters; and various coupling agents such as silane coupling agents and titanate coupling agents. Specific examples may include, without limiting the surface treatment agents to these examples, fatty acids such as caproic acid, caprylic acid, peralgonic acid, capric acid, undecanoic acid, lauric acid, myristic acid, palmitic acid, stearic acid, behenic acid and oleic acid; sodium and potassium salts of these fatty acids; and alkyl esters of these fatty acids. Specific examples of the surfactants may include polyoxyethylenealkylether sulfate and long-chain alcohol sulfates; sulfate anionic surfactants such as sodium and potassium salts of these sulfates; and alkyl benzenesulfonic acids, alkyl naphthalenesulfonic acids, paraffinsulfonic acids, α-olefinsulfonic acid and alkylsulfosuccinic acid, and sulfonate anionic surfactants such as sodium and potassium salts of these acids. Calcium carbonate is preferably treated with a used amount of each of these surface treatment agents falling within a range from 0.1 to 20 wt % in relation to calcium carbonate, and more preferably within a range from 1 to 5 wt %. When the used amount is less than 0.1 wt %, sometimes the improvement effects of the workability, the adhesion and the weather resistant adhesion are not attained to sufficient extents, while when the used amount exceeds 20 wt %, sometimes the storage stability of the curable composition is degraded.

Without imposing any particular constraint, it is preferable that when calcium carbonate is used, precipitated calcium carbonate is adopted as the calcium carbonate, particularly for the case where the improvement effect of the thixotropy of the composition and the improvement effects of the strength at break, the elongation at break, the adhesion, the weather resistant adhesion and the like of the cured substance are desired.

On the other hand, ground calcium carbonate is sometimes added for the purposes of decreasing the viscosity of the composition, extending the composition and reducing the cost of the composition and other purposes; in such cases, the following types of ground calcium carbonate can be used according to need.

Ground calcium carbonate means a product obtained by mechanically crushing and processing natural chalk, marble, limestone or the like. The crushing method includes a dry crushing method and a wet crushing method. A wet crushed product is often unpreferable because it frequently degrade the storage stability of the composition. Ground calcium carbonate is classified into various products each having different average particle size. When the improvement effects of the strength at break, the elongation at break, the adhesion and the weather resistant adhesion of the cured substance are desired, the specific surface area of the crushed product is preferably 1.5 m$^2$/g or more and 50 m$^2$/g or less, more preferably 2 m$^2$/g or more and 50 m$^2$/g or less, furthermore preferably 2.4 m$^2$/g or more and 50 m$^2$/g or less, and particularly preferably 3 m$^2$/g or more and 50 m$^2$/g or less, without imposing any particular constraint. When the specific surface area is less than 1.5 m$^2$/g, the improvement effects of the crushed product are sometimes not sufficient. Needless to say, for the purpose of simply decreasing the viscosity of the composition or extending the composition, the above described surface area ranges are not to be applied.

The value of the specific surface area means a value measured on the basis of the air permeation method (a method for measuring the specific surface area from the permeability of air for a powder charged layer) in conformity with JIS K 5101. It is preferable to use, as a measurement apparatus, an SS-100 specific surface area measurement apparatus manufactured by Shimadzu Corporation.

These fullers may be used each alone or in combinations of two or more thereof, according to the purpose or need. Without imposing any particular constraint, for example, when a ground calcium carbonate having a specific surface area of 1.5 m$^2$/g or more is used in combination with precipitated calcium carbonate, the increase of the viscosity of the composition is moderately suppressed, and the improvement effects of the strength at break, the elongation at break, the adhesion and the weather resistant adhesion of the cured substance can be highly expected to be achieved.

When a filler is used, the addition amount of the filler falls within a range preferably from 5 to 1,000 parts by weight, more preferably from 20 to 500 parts by weight, and particularly preferably from 40 to 300 parts by weight, in relation to 100 parts by weight of a cross-linking silyl group-containing polymer. When the blended amount is less than 5 parts by weight, sometimes the improvement effects of the strength at break, the elongation at break, the adhesion and the weather resistant adhesion of the cured substance are not sufficiently attained, while when the blended amount exceeds 1,000 parts by weight, sometimes the workability of the curable composition is degraded. These fillers may be used each alone or in combinations of two or more thereof.

<Hollow Microparticles>

For the purpose of reducing weight and cost without significantly degrading physical properties, a hollow microparticle material may be used in combination with these reinforcing fillers.

No particular constraint is imposed on such a hollow microparticle (hereinafter referred to as balloon). However, as described in "New Technology for Functional Fillers (in Japanese, "Kinousei Filler no Saishin Gijutsu" published by CMC Publishing Co., Ltd.), examples of such a hollow microparticle may include hollow particles constituted with inorganic or organic materials having a diameter of 1 mm or less, preferably 500 μm or less, and more preferably 200 μm or less. In particular, hollow microparticles having a true specific gravity of 1.0 g/cm$^3$ or less are preferably used, and hollow microparticles having a true specific gravity of 0.5 g/cm$^3$ or less are more preferably used.

Examples of the inorganic balloon may include silicate balloons and non-silicate balloons. Examples of the silicate balloons may include shirasu balloon, perlite, glass (silica) balloon and fly ash balloon; and examples of the non-silicate balloons may include alumina balloon, zirconia balloon and carbon balloon. Specific examples of these inorganic balloons may include the following commercially available balloons: shirasu balloons such as Uinraito manufactured by Idichi Chemical Co., Ltd., Sankilite manufactured by Sanki Engineering Co., Ltd.; glass (silica) balloons such as Fuji Balloon manufactured by Fuji Sylysia Chemical Ltd., Karuun manufactured by Nippon Sheet Glass Co., Ltd., Serusuta Z-28 manufactured by Sumitomo 3M Ltd., Micro Balloon manufactured by Emerson & Cuming, Inc., Celamic Glassmodules manufactured by Pittsburge Corning Corp., Glass Bubbles manufactured by 3M Corp., Q-Cel manufactured by Asahi Glass Co., Ltd. and E-Spheres manufactured by Taiheiyo Cement Corp.; fly ash balloons such as Cerospheres manufactured by Pfamarketing and Fillite manufactured by Fillite U.S.A. Inc.; alumina balloons such as BW manufactured by Showa Denko K.K.; zirconia balloons such as Hollow Zirconium Sphees manufactured by Zircoa, Inc.; and carbon balloons such as Kreca Sphere manufactured by Kureha Chemical Industry Co., Ltd. and Carbosphere manufactured by General Technologies Corp.

Examples of the organic balloons may include thermosetting resin balloons and thermoplastic resin balloons. Examples of the thermosetting balloons may include phenolic balloon, epoxy balloon and urea balloon, and examples of thermoplastic balloons may include Saran balloon, polystyrene balloon, polymethacrylate balloon, polyvinyl alcohol balloon and styrene-acrylic balloon. Balloons of cross-linked thermoplastic resins may also be used. The balloon as referred to herein may include balloons having been subjected to foaming and balloons obtained by foaming after blending materials which contain foaming agents.

Specific examples of these organic balloons may include the following commercially available balloons: phenolic balloons such as UCAR Microballoons and Phenolic Microballoons manufactured by Union Carbide Corp.; epoxy balloons such as Eccospheres manufactured by Emerson & Cuming, Inc.; urea balloons such as Eccospheres VF-O manufactured by Emerson & Cuming, Inc.; Saran balloons such as Saran Microspheres manufactured by Dow Chemical Co., Expancell manufactured by Nippon Filament Co., Ltd. and Matsumoto Microsphere manufactured by Matsumoto Yushi-Seiyaku Co., Ltd., polystyrene balloons such as Dylite Expandable Polystyrene manufactured by Arco Polymers, Inc. and Expandable Polystyrene Beads manufactured by Basf Wyandote Corp.; and cross-linked styrene-acrylic acid balloon such as SX863(P) manufactured by Japan Synthetic Rubber Co., Ltd.

These balloons may be used each alone or as mixtures of two or more thereof. Additionally, balloons surface-treated for the purpose of improving the dispersibility thereof and the workability of the compositions may also be used, the surface treatment being carried out by use of such compounds as fatty acids, fatty acid esters, rosin, lignin rosinate, silane coupling agents, titanium coupling agents, aluminum coupling agents and polypropylene glycol. These balloons are used for the purpose of reducing the weight and cost without degrading the flexibility and the elongation/strength included in the physical properties obtained when the composition is cured.

Without imposing any particular constraint on the content of a balloon, a balloon may be used within a range preferably from 0.1 to 50 parts and more preferably from 0.1 to 30 parts in relation to 100 parts by weight of a cross-linking silyl group-containing polymer. When this content is less than 0.1 part, the weight reducing effect is small, while when the content is 50 parts or more, sometimes the tensile strength is degraded among the mechanical properties obtained when the composition is cured. Additionally, when the specific gravity of the balloon is 0.1 or more, the content range thereof is preferably from 3 to 50 parts, and more preferably from 5 to 30 parts.

<Physical Property Modifiers>

A physical property modifier may be added, according to need, to the polymer of the present invention for the purpose of regulating the tensile properties of the cured substance to be generated.

Without imposing any particular constraint on the physical property modifier, examples of the physical property modifier may include: alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane and γ-glycidoxypropylmethyldiisopropenoxysilane; functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; and polysiloxanes. The use of the physical property modifier makes it possible to increase the hardness or to decrease the hardness to promote the elongation when the composition of the present invention is cured. These physical property modifier may be used each alone or in combinations of two or more thereof.

<Silanol-Containing Compounds>

A silanol-containing compound may be added, according to need, to the polymer of the present invention for the purpose of altering the physical properties of the cured substance. The silanol-containing compound means a compound which has one silanol group in the molecule thereof and/or a compound capable of generating, through reaction with moisture, a compound which has one silanol group in the molecule thereof. Only one of these compounds may be used, or both of these compounds may be simultaneously used.

No particular constraint is imposed on the compound which has one silanol group in the molecule thereof, namely, one of the above silanol group-containing compounds. Examples of the compound having one silanol group may include the following listed compounds, which are represented by the formula (R")$_3$SiOH wherein R"s are the same or different, substituted or non-substituted alkyl or aryl groups:

$(CH_3)_3SiOH$, $(CH_3CH_2)_3SiOH$, $(CH_3CH_2CH_2)_3SiOH$, $(n-Bu)_3SiOH$, $(sec-Bu)_3SiOH$, $(t-Bu)_3SiOH$, $(t-Bu)Si(CH_3)_2OH$, $(C_5H_{11})_3SiOH$, $(C_6H_{13})_3SiOH$, $(C_6H_5)_3SiOH$, $(C_6H_5)_2Si(CH_3)OH$, $(C_6H_5)Si(CH_3)_2OH$, $(C_6H_5)_2Si(C_2H_5)OH$, $C_6H_5Si(C_2H_5)_2OH$, $C_6H_5CH_2Si(C_2H_5)_2OH$, $C_{10}H_7Si(CH_3)_2OH$.

In the above chemical formulas, $C_6H_5$ and $C_{10}H_7$ represent a phenyl group and a naphthyl group, respectively. Among these compounds, small molecular weight $(CH_3)_3SiOH$ and the like are preferable from the viewpoints of easy availability and effects to be obtained.

The above described compounds each having one silanol group in the molecule thereof are inferred to provide the cured substance with flexibility through reducing the number of the cross-linking points by reacting with the cross-linking silyl groups of a cross-linking silyl group-containing polymer or by reacting with the siloxane bonds generated by cross-linking.

No particular constraint is imposed on the compound, one of the components of the present invention, capable of generating a compound having one silanol group in the molecule thereof through reaction with moisture. However, examples of the compound capable of generating a compound having one silanol group may include: N,O-bis(trimethylsilyl)acetamide, N-(trimethylsilyl)acetamide, bis(trimethylsilyl)trifluoroacetamide, N-methyl-N-trimethylsilyltrifluoroacetamide, bistrimethylsilyl urea, N-(t-butyldimethylsilyl)-N-methyl-trifluoroacetamide, (N,N-dimethylamino)trimethylsilane, (N,N-diethylamino)trimethylsilane, hexamethyldisilazane, 1,1,3,3-tetramethyldisilazane, N-(trimethylsilyl)imidazole, trimethylsilyltrifluoromethane sulfonate, trimethylsilyl phenoxide, trimethylsilylated n-octanol, trimethylsilylated 2-ethylhexanol, tris(trimethylsilylated)glycerin, tris(trimethylsilylated)trimethylolpropane, tris(trimethylsilylated)pentaerythritol, tetra(trimethylsilylated)pentaerythritol, $(CH_3)_3SiNHSi(CH_3)_3$, $(CH_3)_3SiNSi(CH_3)_2$, allyloxytrimethylsilane, N,O-bis(trimethylsilyl)acetamide, N-(trimethylsilyl)acetamide, bis(trimethylsilyl)trifluoroacetamide, N-methyl-N-trimethylsilyltrifluoroacetamide, bistrimethylsilyl urea, N-(t-butyldimethylsilyl)-N-methyl-trifluoroacetamide, (N,N-dimethylamino)trimethylsilane, (N,N-diethylamino)trimethylsilane, hexamethyldisilazane, 1,1,3,3-tetramethyldisilazane, N-(trimethylsilyl)imidazole, trimethylsilyltrifluoromethane sulfonate, trimethylsilyl phenoxide, trimethylsilylated n-octanol, trimethylsilylated 2-ethylhexanol, tris(trimethylsilylated)glycerin, tris(trimethylsilylated)trimethylolpropane, tris(trimethylsilylated)pentaerythritol, tetra(trimethylsilylated)pentaerythritol, N,O-bis(trimethylsilyl)acetamide, N-(trimethylsilyl)acetamide, trimethylsilyl phenoxide, trimethylsilylated n-octanol, trimethylsilylated 2-ethylhexanol, tris(trimethylsilylated)glycerin, tris(trimethylsilylated)trimethylolpropane, tris(trimethylsilylated)pentaerythritol, tetra(trimethylsilylated)pentaerythritol, trimethylsilylated polyether polyols such as trimethylsilylated polypropylene glycol and trimethylsilylated polypropylene triol, trimethylsilylated polypropylene tetraol, and trimethylsilylated acryl polyol. However, the compound capable of generating a compound having one silanol group is not limited these examples. These compounds may be used each alone or in combinations of two or more thereof.

The compound capable of generating a compound having one silanol group in the molecule thereof through reaction with moisture generates a compound having one silanol group in the molecule thereof, through the reaction with moisture during storage, at the time of curing or after curing.

The thus generated compound having one silanol group in the molecule thereof, is inferred, as described above, to provide the cured substance with flexibility through reducing the number of the cross-linking points by reacting with the cross-linking silyl groups of a vinyl polymer or by reacting with the siloxane bonds generated by cross-linking.

The silanol-containing compounds may be used in combination with air-oxidation curable substances to be described later; the combinatory use of these compounds and substances preferably improves the curability and reduces the dust adhesion of the alkyd coating material applied onto the surface of the cured substance while the modulus of the cured substance is being maintained at a low value.

The addition amount of each of these silanol-containing compounds may be appropriately regulated according to the expected physical properties of the cured substance. Each of the silanol-containing compounds may be added in a content of 0.1 to 50 parts by weight, preferably 0.3 to 20 parts by weight, and more preferably 0.5 to 10 parts by weight in relation to 100 parts by weight of a cross-linking silyl group-containing polymer. When the content is less than 0.1 part by weight, no addition effect is attained, while when the content exceeds 50 parts by weight, the cross-linking is insufficient and accordingly the strength and the gel fraction of the cured substance are decreased excessively.

No particular constraint is imposed on the addition timing of the silanol-containing compound in such a way that the silanol-containing compound may be added at the time of preparing the polymer, or at the time of preparing the curable composition.

<Thixotropic Agents (Antisagging Agents)>

A thixotropic agent (antisagging agent) may be added to the polymer of the present invention according to need for the purpose of preventing sagging and improving workability.

No particular constraint is imposed on the antisagging agents. However, examples of the antisagging agents may include polyamide waxes; hydrogenated castor oil derivatives; metal soaps such as calcium stearate, aluminum stearate and barium stearate; and fine powdery silica. Although surface treated or non-surface treated fine powdery silica may be used, surface-treated micronized silica is rather preferable. These thixotropic agents (antisagging agents) may be used each alone or in combinations of two or more thereof.

<Photocurable Substances>

A photocurable substance may be added to the polymer of the present invention according to need. The photocurable substance means a substance which is capable of chemically changing the molecular structure thereof in a short time under the action of light to result in physical changes such as curing. Addition of such a photocurable substance permits reducing the tackiness (also referred to as residual tackiness) of the surface of the cured substance obtained by curing the curable composition. The photocurable substance is a substance curable under the irradiation of light, and a typical photocurable substance is, for example, such that it can be cured when it is allowed to stand at a sunny indoor position (in the vicinity of the window) at room temperature for one day. A large number of such substances are known, and they may include organic monomers, oligomers, resins and compositions containing these substances. No particular constraint is imposed on the types of the photocurable substances, and examples thereof may include unsaturated acrylic compounds, polyvinyl cinnamates and azidized resins.

Specific examples of the unsaturated acrylic compounds may include: (meth)acrylates (oligoester acrylates) of low molecular weight alcohols such as ethylene glycol, glycerin, trimethylolpropane, pentaerythritol and neopentyl alcohol;

(meth)acrylates of bisphenol A, acids such as isocyanuric acid and the above described low molecular weight alcohols modified with ethylene oxide and propylene oxide; (meth)acrylates of hydroxy group-terminated polyether polyols each having a polyether main chain, polymer polyols obtained by radical polymerizing vinyl monomers in the polyols each having a polyether main chain, hydroxy group-terminated polyester polyols each having a polyester main chain, and polyols each having a vinyl or (meth)acrylic main chain and having one or more hydroxy groups in the main chain; epoxy acrylate oligomers obtained by reacting bisphenol A type epoxy resins or novolac type epoxy resins with (meth)acrylic acid; and urethane acrylate oligomers, having urethane bonds and (meth)acrylate groups in the molecular chain thereof, obtained by reacting polyols, polyisocyanates and hydroxylated (meth)acrylates.

The polyvinyl cinnamates each mean a photosensitive resin having cinnamoyl groups as photosensitive groups, and examples of them may include polyvinyl alcohol esterified with cinnamic acid, and additionally a large number of polyvinyl cinnamate derivatives.

The azidized resins are known as photosensitive resins having azide groups as photosensitive groups; commonly used are photosensitive rubber liquids each containing an azide compound added as a photosensitive agent therein and examples described in detail in "Photosensitive Resins (Kankosei Jushi)" published by Insatsu Gakkai Shuppanbu Ltd. on Mar. 17, 1972, p. 93, p. 106 and p. 117; these can be used each alone or as mixtures thereof, with the sensitizers added thereto according to need.

Among these photocurable substances, unsaturated acrylic compounds are preferable because of easiness in handling thereof.

Each of the photocurable substances is preferably added in a content of 0.01 to 20 parts by weight in relation to 100 parts by weight of a cross-linking silyl group-containing polymer. When the content is less than 0.01 part by weight, the effects to be obtained are small, while when the content exceeds 20 parts by weight, sometimes adverse effects on the physical properties are caused to occur. It may be noted that addition of sensitizers such as ketones and nitro compounds and/or accelerators such as amines sometimes enhance the effects to be obtained.

<Air-Oxidation Curable Substances>

An air-oxidation curable substance may be added to the polymer of the present invention according to need. The air-oxidation curable substance means a compound which has one or more unsaturated groups capable of cross-linking to cure under the action of oxygen in the air. Addition of such an air-oxidation curable substance permits reducing the tackiness (also referred to as residual tackiness) of the surface of the cured substance obtained by curing the curable composition. The air-oxidation curable substance in the present invention is a substance capable of being cured when brought into contact with the air, and more specifically, a substance which has a characteristic that it is capable of being cured when reacting with oxygen in the air. A typical air-oxidation curable substance is, for example, such that it can be cured when it is allowed to stand in the air indoors for one day.

Specific examples of the air-oxidation curable substances may include: drying oil such as wood oil and flaxseed oil; various alkyd resins obtained by modifying these drying oils; acrylic resins, epoxy resins, silicone resins and urethane resins modified with these drying oils; 1,2-polybutadine, 1,4-polybutadiene, homopolymers and copolymers of dienes having 5 to 8 carbon atoms, and various modified substances derived from these homopolymers and copolymers (maleic modified substances, modified boiled oils and the like). Among these, preferable are wood oil, and liquid polymers (liquid polydienes) of these polydienes and modified liquid polydienes.

Specific examples of the liquid polydienes may include: liquid polymers obtained by homopolymerizing and copolymerizing diene compounds such as butadiene, chloroprene, isoprene and 1,3-pentadiene; and polymers such as NBR and SBR obtained by copolymerizing these diene compounds with monomers such as acrylonitrile and styrene copolymerizable with these diene compounds in such a way that the diene compounds make up the main components, and various modified substances derived therefrom (maleic modified substances, modified boiled oils and the like). These may be used each alone or in combinations of two or more thereof. Among these liquid diene compounds, liquid polybutadiene is preferable.

These air-oxidation curable substances may be used each alone or in combinations of two or more thereof. Concomitant use of a catalyst accelerating oxidative curing reaction and a metallic dryer with one or more of these air-oxidation curable substances sometimes enhances the effects to be obtained. Examples of these catalyst and metallic dryer may include metal salts such as cobalt naphthenate, lead naphthenate, zirconium naphthenate, cobalt octylate and zirconium octylate, and amine compounds.

The air-oxidation curable substance may be used in combination with the photocurable substance; the combinatory use of them is particularly preferable because sometimes the combinatory use displays further enhanced effects of the air-oxidation curable substance, and displays marked staining preventing effect in a case of long-term exposure and also in an area abundant in fine powdery earth and sand and thereby undergoing harsh staining.

The air-oxidation curable substance is preferably added in a content of 0.01 to 20 parts by weight in relation to 100 parts by weight of a cross-linking silyl group-containing polymer. When the content is less than 0.01 part by weight, the effects to be obtained are small, while when the content exceeds 20 parts by weight, adverse effects on the physical properties are sometimes caused to occur.

<Antioxidants>

An antioxidant may be added to the polymer of the present invention according to need. Various antioxidants are known, and various antioxidants are cited in "Handbook of Antioxidants" published by Taiseisha and "Deterioration and Stabilization of Polymer Materials" (pp. 235 to 242) published by C.M.C. Chemistry Co. Ltd.; however, the antioxidants are not limited to these cited examples. Examples of the antioxidant may include thioether antioxidants such as Mark PEP-36, Mark AO-23 (manufactured by Asahi Denka Co., Ltd.); and phosphorus-based antioxidants such as Irgafos 38, Irgafos 168 and Irgafos P-EPQ (manufactured by Ciba Specialty Chemicals Ltd.). Among various antioxidants, hindered phenol compounds as shown below are preferable.

Specific examples of the hindered phenol compounds may include: 2,6-di-tert-butyl-4-methylphenol, 2,6-di-tert-butyl-4-ethylphenol, mono(or di, or tri)(α-methylbenzyl)phenol, 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,5-di-tert-butylhydroquinone, 2,5-di-tert-amyl-hydroquinone, triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl-tetrakis[3-(3,5-di-t-butyl-4-hydroxyphenyl) propionate], 2,2-thio-diethylenebis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxy-hydrocinnamamide), 3,5-di-t-butyl-4-hydroxy-benzylphosphonate-diethylester, 1,3,5-trimethyl-2,4,6-tris(3,5-di-t-butyl-4-hydroxybenzyl)benzene, calcium bis(3,5-di-t-butyl-4-hydroxybenzylphosphonic acid ethyl ester), tris(3,5-di-t-butyl-4-hydroxybenzyl)isocyanurate, 2,4-2,4-bis[(octylthio)methyl]-o-cresol, N,N'-bis[3-(3,5-di-t-butyl-4-hydroxyphenyl)propionyl]hydrazine, tris(2,4-di-t-butylphenyl)phosphite, 2-(5-methyl-2-hydroxyphenyl)benzotriazole, 2-[2-hydroxy-3,5-bis($\alpha,\alpha$-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)benzotriazole, condensate between methyl-3-[3-t-butyl-5-(2H-benzotriazol-2-yl)-4-hydroxyphenyl] propionate and polyethylene glycol (molecular weight: about 300), hydroxyphenylbenzotriazole derivatives, bis(1,2,2,6,6-pentamethyl-4-piperidyl)2-(3,5-di-t-butyl-4-hydroxybenzyl)-2-n-butylmalonate, and 2,4-di-t-butylphenyl-3,5-di-t-butyl-4-hydroxybenzoate.

Examples may include in terms of trade names: Nocrac 200, Nocrac M-17, Nocrak SP, Nocrac SP-N, Nocrac NS-5, Nocrac NS-6, Nocrac NS-30, Nocrac 300, Nocrac NS-7 and Nocrac DAH (manufactured by Ouchishinko Chemical Industrial Co., Ltd.); Mark AO-30, Mark AO-40, Mark AO-50, Mark AO-60, Mark AO-616, Mark AO-635, Mark AO-658, Mark AO-80, Mark AO-15, Mark AO-18, Mark 328 and Mark AO-37 (manufactured by Asahi Denka Co., Ltd.); Irganox-245, Irganox-259, Irganox-565, Irganox-1010, Irganox-1024, Irganox-1035, Irganox-1076, Irganox-1081, Irganox-1098, Irganox-1222, Irganox-1330 and Irganox-1425WL (manufactured by Ciba Specialty Chemicals Ltd.): and Sumilizer GM and Sumilizer GA-80 (manufactured by Sumitomo Chemical Co., Ltd.). However, the antioxidants are not limited to these examples.

The antioxidant may be used in combination with the photostabilizer to be described later; the combinatory use of them is particularly preferable because sometimes the combinatory use displays further enhanced effects of the antioxidant, and particularly improves the heat resistance. Tinuvin C353 and Tinuvin B75 (manufactured by Ciba Specialty Chemicals Ltd.) in each of which an antioxidant and a photostabilizer are blended in advance may also be used.

The used amount of each of the antioxidant preferably falls within a content range from 0.1 to 10 parts by weight in relation to 100 parts by weight of a cross-linking silyl group-containing polymer. When the content is less than 0.1 part by weight, the improvement effect of the weather resistance is small, while when the content exceeds 5 parts by weight, the effects to be obtained do not necessarily grow with the content increase and hence economic disadvantages are thereby provided.

<Photostabilizers>

A photostabilizer may be added to the polymer of the present invention according to need. Various photostabilizers are known, and various photostabilizers are cited in "Handbook of Antioxidants" published by Taiseisha, "Deterioration and Stabilization of Polymer Materials" (pp. 235 to 242) published by C.M.C. Chemistry Co. Ltd. and other sources; however, the photostabilizers are not limited to these cited examples. Among photostabilizers, ultraviolet absorbers and hindered amine photostabilizer compounds are preferable. Specific examples of the photostabilizers may include: benzotriazole compounds such as Tinuvin P, Tinuvin 234, Tinuvin 320, Tinuvin 326, Tinuvin 327, Tinuvin 329 and Tinuvin 213; triazine compounds such as Tinuvin 1577; benzophenone compounds such as Chimassorb 81; and benzoate compounds such as Tinuvin 120 (all manufactured by Ciba Specialty Chemicals Ltd.).

Hindered amine compounds are also preferable, as listed below. Examples of the hindered amine compounds may include: dimethyl succinate-1-(2-hydroxyethyl)-4-hydroxy-2,2,6,6-tetramethylpiperidine polycondensate, poly[{6-(1,1,3,3-tetramethylbutyl)amino-1,3,5-triazin-2,4-diyl}{(2,2,6,6-tetramethyl-4-piperidyl)imino}], N,N'-bis(3-aminopropyl)ethylenediamine-2,4-bis[N-butyl-N-(1,2,2,6,6-pentamethyl-4-piperidyl)amino]-6-chloro-1,3,5-triazine condensate, bis(2,2,6,6-tetramethyl-4-piperidyl)sebacate, and bis(2,2,6,6-tetramethyl-4-piperidinyl)succinate.

Examples may include in terms of trade names: Tinuvin 622LD, Tinuvin 144, Chimassorb 944LD, Chimassorb 119FL and Irgafos 168 (manufactured by Ciba Specialty Chemicals Ltd.); Mark LA-52, Mark LA-57, Mark LA-62, Mark LA-67, Mark LA-63, Mark LA-68, Mark LA-82 and Mark LA-87 (manufactured by Asahi Denka Co., Ltd.); Sanol LS-770, Sanol LS-765, Sanol LS-292, Sanol LS-2626, Sanol LS-1114, Sanol LS-744 and Sanol LS-440 (manufactured by Sankyo Co., Ltd.). However, the photostabilizers are not limited to these examples.

The photostabilizer may be used in combination with the above described antioxidant; the combinatory use of them is particularly preferable because sometimes the combinatory use displays further enhanced effects of the photostabilizer, and particularly improves the weather resistance. No particular constrain is imposed on the combinations between the photostabilizers and the antioxidants. However, for example, the combinations between the above described hindered phenol antioxidants and the above described benzotriazole ultraviolet absorbers, and the combinations between the above described hindered phenol antioxidants and the above described hindered amine photostabilizer compounds are preferable. The combinations between the above described hindered phenol antioxidants with, for example, the above described benzotriazole ultraviolet absorbers and hindered amine photostabilizer compounds are also preferable. Tinuvin C353 and Tinuvin B75 (manufactured by Ciba Specialty Chemicals Ltd.) in each of which a photostabilizer and an antioxidant are blended in advance may also be used.

The hindered amine photostabilizer may be used in combination with the above described photocurable substance; the combinatory use of them is particularly preferable because sometimes the combinatory use displays further enhanced effects of the hindered amine photostabilizer, and particularly improves the weather resistance. No particular constrain is imposed on the combinations between the hindered amine photostabilizers and the photocurable substances. In this connection, however, tertiary amine-containing hindered amine photostabilizers are preferable because they provide small increase in viscosity during storage and satisfactory storage stability.

The used amount of each of the photostabilizers preferably falls within a content range from 0.1 to 10 parts by weight in relation to 100 parts by weight of a cross-linking silyl group-containing polymer. When the content is less than 0.1 part by weight, the improvement effect of the weather resistance is small, while when the content exceeds 5 parts by weight, the effects to be obtained do not necessarily grow with the content increase and hence economic disadvantages are thereby provided.

<Epoxy Resins>

The composition of the present invention may comprise an epoxy resin and an epoxy resin curing agent. When a mixture of the vinyl polymer of the present invention and an epoxy resin is cured, a cured substance having a high strength and a high adhesive force is obtained. As the epoxy resin, those well known in the art can be widely used, and examples of such epoxy resins may include bisphenol-A epoxy resin, bisphenol-F epoxy resin, bisphenol-AD epoxy resin, bisphenol-S epoxy resin, epoxy resins obtained by hydrogenating these epoxy resins, glycidyl ester epoxy resin, glycidyl amine epoxy resin, alicyclic epoxy resin, novolac epoxy resin, urethane-modified epoxy resin having urethane bonds, fluorinated epoxy resin, rubber-modified epoxy resin containing polybutadiene or NBR, and flame retardant epoxy resins such as glycidyl ether of tetrabromobisphenol-A. These epoxy resins may be used each alone or in combinations of two or more thereof. Among these epoxy resins, bisphenol-A epoxy resin is preferable from the viewpoint of the balance between the workability, curability, adhesion strength, versatility with respect to the applicable adherends, water resistance, durability and the like.

The used amount of such an epoxy resin is such that it may be used in any proportion. However, for the purpose of using such an epoxy resin as an elastic adhesive or the like, namely, for the purpose of using such an epoxy resin in such a way that the properties as an elastic substance are still maintained after curing, it is recommended that such an epoxy resin is usually used in a content falling within a range from 10 to 80 parts by weight, and preferably within a range from 20 to 70 parts by weight in relation to 100 parts by weight of a cross-linking silyl group-containing polymer. Unpreferably, when the content is less than 10 parts by weight, the adhesion strength and the water resistance become insufficient, while when the content exceeds 80 parts by weight, the decease of the peel strength and the like occurs.

The composition of the present invention may include an epoxy resin curing agent. As the epoxy resin curing agent, those well known in the art may be widely used. Examples of the epoxy resin curing agent may include: aliphatic amines such as ethylenediamine, diethylenetriamine, triethylenetetramine, tetraethylenepentamine, diethylaminopropylamine, hexamethylenediamine, methylpentamethylenediamine, trimethylhexamethylenediamine, guanidine and oleylamine; alicyclic amines such as menthenediamine, isophoronediamine, norbornanediamine, piperidine, N,N'-dimethylpiperazine, N-aminoethylpiperazine, 1,2-diaminocyclohexane, bis(4-amino-3-methylcyclohexyl)methane, bis(4-aminocyclohexyl)methane, polycyclohexylpolyamine and 1,8-diazabicyclo[5,4,0]undecene-7 (DBU); aromatic amines such as methaphenylenediamine, 4,4'-diaminodiphenylmethane and 4,4'-diaminodiphenylsulfonic acid; aliphatic-aromatic amines such as m-xylylenediamine, benzyldimethylamine, 2-(dimethylaminomethyl)phenol, and 2,4,6-tris(dimethylaminomethyl)phenol; ether bond-containing amines such as 3,9-bis(3-aminopropyl)-2,4,8,10-tetraoxaspiro[5,5]undecane (ATU), morpholine, N-methylmorpholine, polyoxypropylenediamine, polyoxypropylenetriamine and polyoxyethylenediamine; hydroxylated amines such as diethanolamine and triethanolamine; acid anhydrides such as tetrahydrophthalic anhydride, methyltetrahydrophtalic anhydride, methylnadic anhydride, hexahydrophthalic anhydride and dodecylsuccinic anhydride; polyamide amines such as polyamides obtained by reacting dimer acids with polyamines such as diethylenetriamine and triethylenetetramine and polyamides obtained by reacting polycarboxylic acids other than dimer acids with the polyamines; imidazoles such as 2-ethyl-4-methylimidazole; dicyandiamide; polyoxypropylene amines such as polyoxypropylene diamine and polyoxypropylene triamine; phenols; modified amines such as epoxy modified amines obtained by reacting the above described amines with epoxy compounds, Mannich-modified amines obtained by reacting the above described amines with formalin and phenols, Michael addition-modified amines and ketimines; and amine salts such as 2-ethylhexanoate of 2,4,6-tris(dimethylaminomethyl)phenol. These curing agents may be used each alone or in combinations of two or more thereof. Among these epoxy resin curing agents, 2,4,6-tris(dimethylaminomethyl)phenol and polyoxypropylene diamines are preferable from the viewpoint of the balance between curability and physical properties.

It is recommended that such an epoxy resin curing agent is used usually in a content falling within a range from approximately 1 to 60 parts by weight and preferably in a content falling within a range from approximately 2 to 50 parts by weight in relation to 100 parts by weight of a cross-linking silyl group-containing polymer, although the content concerned depends on the blended amount of the epoxy resin. When the content is less than 1 part by weight, the curing of the epoxy resin is insufficient and the adhesion strength is degraded. Unpreferably, when the content exceeds 60 parts by weight, bleeding and the like occur into the interface and the adhesion is degraded.

<Other Additives>

Various additives may be added to the polymer of the present invention according to need for the purpose of adjusting the various physical properties of the curable composition or the cured substance. Examples of such additives may include a flame retardant, a curability modifier, a metal deactivator, an antiozonant, a phosphorus-based peroxide decomposer, a lubricant, a pigment and a foaming agent. These additives may be used each alone or in combinations of two or more types thereof.

Specific examples of such additives are described in Japanese Patent Publication Nos. 4-69659 and 7-108928 and Japanese Patent Laid-Open Nos. 63-254149 and 64-22904.

The polymer of the present invention can be used substantially without any solvent. A solvent may be used from the viewpoint of workability, but it is desirable not to use any solvent in view of environmental effects.

<Preparation of One-Part and Two-Part Compositions>

A curable composition which uses the polymer of the present invention can be prepared as a one-part composition in which all the ingredients are blended and hermetically stored in advance under the condition of dried atmosphere and the curing of the composition is carried out by the action of the moisture in the air after application of the composition. A curable composition which uses the polymer of the present invention can also be prepared as a two-part composition in which the ingredients such as a curing catalyst, a filler, a plasticizer, water and the like are blended in advance separately as a curing component, and the curing component composed of the blended ingredients and a polymer composition component are mixed together immediately before application. When a two-part composition is adopted, a colorant can be added at the time of mixing of the two components; thus, when a sealant in harmony in color with a siding board is provided, a wide variety of colors can be made available on the basis of a rather limited stock of polymer compositions; in this way and some other ways, such a two-part composition makes it easy to meet the market demand for a wider range of colors, and is thereby more preferable for use in low-rise building construction and the like. When a paste prepared by mixing, for example, a pigment and a plasticizer or a paste prepared by further mixing a filler as the case may be is used as a colorant, the operations involved are made easier. By adding a retardant at the time of mixing the two components, the curing rate can be finely regulated at the working spot.

EXAMPLES

Further detailed description will be made below on the present invention with reference to the below described examples, but the present invention is not limited only to these examples.

Preparation Example 1

<Polymerization step> By use of a polypropylene triol having a molecular weight of about 3000 as an initiator and a zinc hexacyanocobaltate-glyme complex catalyst, propylene oxide was polymerized to yield a hydroxy group-terminated polyether having a number average molecular weight of about 15,000 (an end-group molecular weight derived from an end-group concentration determination).
<Allylation step> Subsequently, a methanol solution of 1.2 equivalents of NaOMe in relation to the hydroxy groups of the hydroxy group-terminated polyether oligomer was added and the methanol was distilled off, and 3-chloro-1-propene was added to convert the hydroxy groups into the allyl groups.
<Purification step> To this reaction mixture, hexane and water were added to extract the ionic impurities into the water layer, then the water layer was separated and removed, and the hexane layer was concentrated and subjected to a volatilization under reduced pressure to yield a purified polypropylene oxide (allyl-terminated polyether) having an ally group at each of both terminals and a number average molecular weight of about 15,000.
<Silylation step> Then, the polypropylene oxide thus obtained was reacted with dimethoxymethylsilane in the presence of an isopropyl alcohol solution of chloroplatinic acid as catalyst to yield a reactive silicon group-terminated polyether (a reactive silicon group-containing polyether). The concentrations of Co and Zn were determined by means of the ICP emission spectrochemical analysis to be 0.47 and 4.7 ppm, respectively.

Preparation Examples 2 to 11

Reactive silicon group-containing polyethers were obtained in the same manner as in Preparation Example 1 except that in the purification step the amounts of hexane and water were altered and the extraction separation rates were altered. The concentrations of Co and Zn were determined in the same manner as in Preparation Example 1. The results obtained are shown in Table 1.

Preparation Example 12

A reactive silicon group-containing polyether was obtained in the same manner as in Preparation Example 1 except that the purification method in the purification step was changed from the hexane/water extraction method to a filtration method. The concentrations of Co and Zn were found to be 0.9 and 6.4 ppm, respectively.

TABLE 1

|    | Prep. ex. 1 | Prep. ex. 2 | Prep. ex. 3 | Prep. ex. 4 | Prep. ex. 5 | Prep. ex. 6 | Prep. ex. 7 | Prep. ex. 8 | Prep. ex. 9 | Prep. ex. 10 | Prep. ex. 11 | Prep. ex. 12 |
|----|------|------|------|------|------|------|------|------|------|------|------|------|
| Co | 0.47 | 0.46 | 0.41 | 0.35 | 0.29 | 0.15 | 0.08 | 0.62 | 0.83 | 0.87 | 1.1  | 0.9  |
| Zn | 4.7  | 4.9  | 3.6  | 4.7  | 3.3  | 2.5  | 1.4  | 5.1  | 4.1  | 6.0  | 5.2  | 6.4  |

Preparation Examples 13 to 24

The allyl-terminated polyethers in Preparation Examples 1 to 12 were reacted with γ-mercaptopropylmethyldimethoxysilane or γ-mercaptopropyltrimethoxysilane to yield reactive silicon group-terminated polyethers.

TABLE 2

|  | Prep. ex. 13 | Prep. ex. 14 | Prep. ex. 15 | Prep. ex. 16 | Prep. ex. 17 | Prep. ex. 18 | Prep. ex. 19 | Prep. ex. 20 | Prep. ex. 21 | Prep. ex. 22 | Prep. ex. 23 | Prep. ex. 24 |
|---|---|---|---|---|---|---|---|---|---|---|---|---|
| Allyl-terminated polyether | Prep. ex. 1 | Prep. ex. 2 | Prep. ex. 3 | Prep. ex. 4 | Prep. ex. 5 | Prep. ex. 6 | Prep. ex. 7 | Prep. ex. 8 | Prep. ex. 9 | Prep. ex. 10 | Prep. ex. 11 | Prep. ex. 12 |
| Type of mercaptosilane | Di | Di | Tri | Di | Tri | Di | Di | Tri | Di | Tri | Di | Di |

Preparation Example 25

<Polymerization step> By use of a polypropylene diol having a molecular weight of about 3000 as an initiator and a zinc hexacyanocobaltate-glyme complex catalyst, propylene oxide was polymerized to yield a hydroxy group-terminated polyether having a number average molecular weight of about 12,000 (an end-group molecular weight derived from an end-group concentration determination).
<Purification step> The catalyst was treated with a strong alkali; then the reaction mixture was neutralized and then purified by filtration.
<Silylation step> The polyether thus obtained was reacted with γ-isocyanatepropylmethyldimethoxysilane in an atmosphere of nitrogen, until no isocyanate group remained, to yield a reactive silicon group-terminated polyether. The concentrations of Co and Zn were determined by means of the ICP emission spectrochemical analysis to be 0.2 and 0.4 ppm, respectively.

Preparation Example 26

A reactive silicon group-containing polyether was obtained in the same manner as in Preparation Example 25, except that in the purification step, the alkali treatment conditions were altered. The concentrations of Co and Zn were measured in the same manner as in Preparation Example 25. The results obtained are shown in Table 3.

Preparation Example 27

<Polymerization step> By use of a polypropylene diol having a molecular weight of about 3000 as an initiator and a zinc hexacyanocobaltate-glyme complex catalyst, propylene oxide was polymerized to yield a hydroxy group-terminated polyether having a number average molecular weight of about 10,000 (an end-group molecular weight derived from an end-group concentration determination).
<Purification step> The catalyst was treated with a strong alkali; then the reaction mixture was neutralized and then purified by filtration.
<Silylation step> The polyether thus obtained was reacted with 2,4-trilene diisocyanate in an atmosphere of nitrogen to yield an isocyanate group-terminated prepolymer. The prepolymer was further reacted with γ-aminopropylmethyldimethoxysilane to yield a reactive silicone group-terminated polyether. The concentrations of Co and Zn were determined by means of the ICP emission spectrochemical analysis to be 0.3 and 1.2 ppm, respectively.

Preparation Example 28

A reactive silicon group-containing polyether was obtained in the same manner as in Preparation Example 27 except that in the purification step, the alkali treatment conditions were altered. The concentrations of Co and Zn were measured in the same manner as in Preparation Example 27. The results obtained are shown in Table 3.

TABLE 3

|  | Prep. ex. 25 | Prep. ex. 26 | Prep. ex. 27 | Prep. ex. 28 |
| --- | --- | --- | --- | --- |
| Co | 0.2 | 0.7 | 0.3 | 1.2 |
| Zn | 0.4 | 0.8 | 1.2 | 4.1 |

Preparation Example 29

A solution obtained by dissolving 2.6 g of azobisisobutyronitrile as a polymerization initiator in a mixture of 6.0 g of butyl acrylate, 66 g of methyl methacrylate, 13 g of stearyl methacrylate, 5.4 g of γ-methacryloxypropylmethyldimethoxysilane, 7.0 g of γ-mercaptopropylmethyldimethoxysilane and 23 g of isobutanol was added dropwise into 43 g of isobutanol heated to 105° C. over a period of 4 hours, and then postpolymerization was allowed to proceed for 2 hours, to yield a vinyl polymer having a solid content concentration of 60% and a number average molecular weight (Mn) of 1,900 based on GPC (relative to polystyrene standards).

Preparation Examples 30 to 45

Each of the reactive silicon group-containing polyethers obtained in Preparation Examples 1 to 12 and 25 to 28 was mixed with the vinyl polymer obtained in Preparation Example 29 at a solid weight ratio of 60:40, and then the solvent was removed to yield a homogeneous and transparent reactive silicon group-containing polyether/vinyl polymer mixture (Table 4). Table 5 shows the Co and Zn concentrations (calculated values) of Preparation Examples 30 to 45, derived from the measured values given in Tables 1 and 3.

TABLE 4

|  | Reactive silicon group-containing polyether | Vinyl polymer |
| --- | --- | --- |
| Prep. ex. 30 | Prep. ex. 1 | Prep. ex. 29 |
| Prep. ex. 31 | Prep. ex. 2 | Prep. ex. 29 |
| Prep. ex. 32 | Prep. ex. 3 | Prep. ex. 29 |
| Prep. ex. 33 | Prep. ex. 4 | Prep. ex. 29 |
| Prep. ex. 34 | Prep. ex. 5 | Prep. ex. 29 |
| Prep. ex. 35 | Prep. ex. 6 | Prep. ex. 29 |
| Prep. ex. 36 | Prep. ex. 7 | Prep. ex. 29 |
| Prep. ex. 37 | Prep. ex. 8 | Prep. ex. 29 |
| Prep. ex. 38 | Prep. ex. 9 | Prep. ex. 29 |
| Prep. ex. 39 | Prep. ex. 10 | Prep. ex. 29 |
| Prep. ex. 40 | Prep. ex. 11 | Prep. ex. 29 |
| Prep. ex. 41 | Prep. ex. 12 | Prep. ex. 29 |
| Prep. ex. 42 | Prep. ex. 25 | Prep. ex. 29 |
| Prep. ex. 43 | Prep. ex. 26 | Prep. ex. 29 |
| Prep. ex. 44 | Prep. ex. 27 | Prep. ex. 29 |
| Prep. ex. 45 | Prep. ex. 28 | Prep. ex. 29 |

TABLE 5

|  | Co | Zn |
| --- | --- | --- |
| Prep. ex. 30 | 0.31 | 2.8 |
| Prep. ex. 31 | 0.27 | 1.7 |
| Prep. ex. 32 | 0.25 | 2.2 |
| Prep. ex. 33 | 0.21 | 2.8 |
| Prep. ex. 34 | 0.17 | 2.0 |
| Prep. ex. 35 | 0.09 | 1.5 |
| Prep. ex. 36 | 0.05 | 0.84 |
| Prep. ex. 37 | 0.37 | 3.1 |
| Prep. ex. 38 | 0.50 | 2.5 |
| Prep. ex. 39 | 0.52 | 3.6 |
| Prep. ex. 40 | 0.66 | 3.1 |
| Prep. ex. 41 | 0.93 | 3.8 |
| Prep. ex. 42 | 0.12 | 0.24 |
| Prep. ex. 43 | 0.42 | 0.48 |
| Prep. ex. 44 | 0.18 | 0.72 |
| Prep. ex. 45 | 0.72 | 2.5 |

Measurement Examples 1 to 28

Each of the reactive silicon group-containing polyethers and the polyether/vinyl polymer mixtures obtained in Preparation Examples 13 to 24 and 30 to 45 was placed in a glass vessel and subjected to an accelerated storage at 80° C. for 2 days. The red coloration after the accelerated storage of each of these polyethers and mixtures was measured with a color-difference meter (Nippon Denshoku Industries Co., Ltd., 300A), and the results thus obtained are shown in Table 6.

Color measurement method: Each of the polyethers and mixtures was placed in a 1-cm square cell and centrifugally defoamed, and then the a* value was measured on the basis of the transmission method. Pure water was used as the blank.

Relation between the a* value representing the magnitude of coloration and the external appearance:

−0.5<a*≦0.5: colorless (good)
0.5<a*≦1.0: pale pink (good)
1.0<a*≦5: pink (good)
5<a*: red (poor)

TABLE 6

| Measure. ex. No. | Reactive silicon group-containing polyether or polyether/vinyl polymer mixture | Magnitude of coloration a* value | Color (evaluation) |
|---|---|---|---|
| 1 | Prep. ex. 13 | 3.9 | Pink (good) |
| 2 | Prep. ex. 14 | 3.4 | Pink (good) |
| 3 | Prep. ex. 15 | 3.5 | Pink (good) |
| 4 | Prep. ex. 16 | 3.4 | Pink (good) |
| 5 | Prep. ex. 17 | 1.9 | Pink (good) |
| 6 | Prep. ex. 18 | 0.9 | Pale pink (good) |
| 7 | Prep. ex. 19 | −0.1 | Colorless (good) |
| 8 | Prep. ex. 20 | 5.4 | Red (poor) |
| 9 | Prep. ex. 21 | 7.7 | Red (poor) |
| 10 | Prep. ex. 22 | 9.3 | Red (poor) |
| 11 | Prep. ex. 23 | 13.0 | Red (poor) |
| 12 | Prep. ex. 24 | 9.7 | Red (poor) |
| 13 | Prep. ex. 30 | 2.2 | Pink (good) |
| 14 | Prep. ex. 31 | 2.1 | Pink (good) |
| 15 | Prep. ex. 32 | 1.9 | Pink (good) |
| 16 | Prep. ex. 33 | 1.9 | Pink (good) |
| 17 | Prep. ex. 34 | 1.3 | Pink (good) |
| 18 | Prep. ex. 35 | 0.4 | Colorless (good) |
| 19 | Prep. ex. 36 | −0.4 | Colorless (good) |
| 20 | Prep. ex. 37 | 2.5 | Pink (good) |
| 21 | Prep. ex. 38 | 4.5 | Pink (good) |
| 22 | Prep. ex. 39 | 5.2 | Red (poor) |
| 23 | Prep. ex. 40 | 7.0 | Red (poor) |
| 24 | Prep. ex. 41 | 5.2 | Red (poor) |
| 25 | Prep. ex. 42 | 0.9 | Pale pink (good) |
| 26 | Prep. ex. 43 | 3.5 | Pink (good) |
| 27 | Prep. ex. 44 | 1.2 | Pink (good) |
| 28 | Prep. ex. 45 | 7.2 | Red (poor) |

ADVANTAGEOUS EFFECT OF THE PRESENT INVENTION

The present invention is able to provide a reactive silicon group-containing organic polymer free from a problem of red coloration.

INDUSTRIAL APPLICABILITY

The polymer of the present invention forms three dimensional network structure to be cured by the action of the moisture when exposed to the air. The polymer of the present invention is useful as an elastic sealant and an adhesive, and can be used as a sealant and an adhesive for buildings, ships, vehicles, road and the like. Moreover, the polymer of the present invention can adhere, by itself or with the aid of a primer, to a wide variety of substrates including glass, porcelain, woods, metals and molded resin substances, and accordingly, can be used as various types of sealing compositions and adhesive compositions. The polymer obtained according to the method of the present invention can be particularly effectively used for highly weather resistant sealants/adhesives, or clear type sealants/adhesives and high-strength type sealants/adhesives.

The invention claimed is:

1. A process for producing an organic polymer composition which comprises Co in a content of 0.05 to 0.5 ppm, and comprised of a mixture of a reactive silicon group-containing polyether (A) and a vinyl polymer (B) which is obtained by polymerizing a vinyl monomer in the presence of a mercapto group-containing compound as a chain transfer agent, wherein in the preparation of the recited silicon group-containing polyether, the Co is present as a residue of a cobalt polymerization catalyst employed during the producing of component (A) and a purification step comprised of the following (a) is employed, wherein (a) comprises adding, to a reaction mixture containing an allyl-terminated polymer, hexane and water to extract ionic impurities into a water layer, then separating and removing the water layer, and then concentrating and subjecting the hexane layer to a volatilization under reduced pressure to yield a purified allyl-terminated polyether.

2. A process for producing an organic polymer composition, which comprises Co in a content of 0.05 to 0.5 ppm, and comprised of a mixture of a reactive silicon group-containing polyether (A) and a vinyl polymer (B) which is obtained by polymerizing a vinyl monomer in the presence of a mercapto group-containing compound as a chain transfer agent, wherein in the preparation of the recited silicon group-containing polyether, a purification step comprises treating a reaction mixture containing a hydroxyl group-terminated polyether and a catalyst with a strong alkali, then neutralizing the reaction mixture, and then purifying the reaction mixture by filtration.

* * * * *